Patented Aug. 6, 1940

2,210,563

UNITED STATES PATENT OFFICE 2,210,563

PRODUCTION OF ALKYL HALIDES

Leonid Andrussow, Mannheim, and Gerhard Stein, Ludwigshafen-on-the-Rhine, Germany, assignors, by mesne assignments, to General Aniline & Film Corporation, New York, N. Y., a corporation of Delaware No Drawing. Application December 10, 1935, Serial No. 53,714. In Germany January 17, 1935

6 Claims. (Cl. 260—652)

The present invention relates to the manufacture and production of alkyl halides.

We have found that alkyl halides and unsaturated organic compounds can simultaneously be obtained in a manner which is very advantageous industrially by treating halogenated hydrocarbons which contain in the molecule at least one halogen atom and one hydrogen atom attached to two adjacent carbon atoms with aliphatic alcohols and/or ethers at elevated temperature in the presence of a catalyst.

As halogen compounds of the said kind suitable as starting materials there may be mentioned practically all aliphatic and alicyclic halogenated hydrocarbons and also those aromatic-aliphatic and heterocyclic halogenated hydrocarbons in which the halogen atoms are combined with carbon atoms not being members of an aromatic nucleus and there may be employed not only mono halogenated hydrocarbons but also those which contain two or more halogen atoms. For example there may be mentioned propyl chloride, isopropyl chloride, isopropyl iodide, isobutyl bromide, chlorcyclohexane and bornyl chlorides. As compounds containing more than one halogen atom may be mentioned for example di- and trichlorethanes, tetra-, penta-chlorethanes, 1,2-dibromcyclohexane and the like.

Suitable alcohols or ethers are for example the aliphatic, alicyclic and aliphatic-aromatic alcohols and/or their ethers as for example methyl, ethyl, propyl, butyl, isopropyl, isobutyl and benzyl alcohol or glycols and any ethers derived from the same. Ethers of such alcohols, as for example of vinyl alcohol, which are not stable in the free state may be employed according to this invention. If mixed ethers be employed instead of simple ethers, corresponding mixtures of alkyl halides are obtained.

The reaction is liable to proceed according to the equations which are given by way of example:

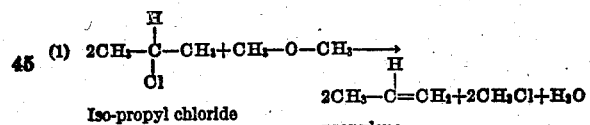

Iso-propyl chloride propylene

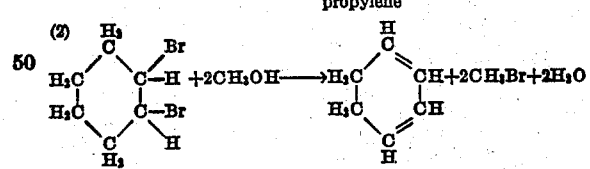

Dibromcyclohexane dihydrobenzene

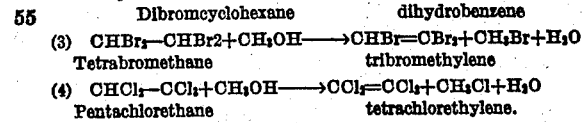

Pentachlorethane tetrachlorethylene.

The catalysts employed in the present process may be chosen from the group consisting of difficultly reducible oxides and salts. Specially suitable for this purpose are catalysts having a hydrating or dehydrating action. As catalysts of the said kind there may be mentioned oxides of barium, zinc, aluminium, silicon, titanium, zirconium, thorium, aluminium sulphate, phosphates of aluminium, iron, cerium, bismuth, silver, and uranium, also zinc tungstate or zinc chromate, they may be employed in admixture with one another or deposited on carriers. In some cases the catalysts are particularly active in a peptized state or in the form of gels.

Generally speaking the reaction may be carried out at any desired pressure. If the alcohols and/or ethers used tend to form olefines, this tendency may be suppressed by using increased pressure. In this case pressures of up to about 50 atmospheres, advantageously up to about 20 atmospheres are employed. Pressures amounting to 100 atmospheres may however be applied as well. The process is carried out at temperatures between 150° and 500° C., advantageously between 250° and 350° C. The most favourable temperatures lie between 260° and 320° C. In some cases it is preferable to employ one of the initial materials in excess, especially when working in a cycle.

The reaction usually proceeds in a practically quantitative manner. In most cases, as for example in the formation of methyl chloride, the reaction products may be very readily separated from each other.

As compared to the process so far employed for the manufacture of alkyl halides the process according to the present invention presents valuable advantages. Thus, for example, in the usual chlorination of methane to methyl chloride and methylene chloride, as well as in other direct chlorinations of aliphatic compounds chloroform and carbon tetrachloride are formed. When producing alkyl halides in accordance with the present process, however, chloroform and carbon tetrachloride in general are not obtained. This process allows to produce alkyl halides in an advantageous manner, valuable unsaturated compounds being simultaneously formed. Thus, the halogen split off from the saturated halogen compounds employed as starting materials is obtained not in the form of inorganic salts of only slight value but it is simultaneously rendered useful for the formation of industrially valuable alkyl halides. Organic halogen compounds which as acids, esters, ketones or aldehydes cannot withstand unchanged a treatment with alkalies, can thus be easily converted into the corresponding unsaturated compounds.

The alkyl halides obtained in the said manner as well as the unsaturated compounds may be employed as intermediate products for the preparation of dyestuffs, assistants for the textile and related industries and artificial compositions.

The following examples will further illustrate how our said invention is carried out in practice, but the invention is not restricted to these examples.

*Example 1*

A vaporous mixture of equivalent amounts of isopropyl-chloride and dimethyl ether is led over aluminium oxide at 290° C. Propylene and methyl chlorid, are obtained in almost quantitative yields.

*Example 2*

A vaporous mixture of equivalent amounts of isopropyl bromide and dimethyl ether is led over thorium oxide at 300° C. Propylene and methyl bromide are obtained in quantitative yields.

*Example 3*

A vaporous mixture of equivalent amounts of isopropyl iodide and methanol is led over aluminium oxide gel at 280° C. Propylene and methyl iodide are obtained in quantitative yields.

*Example 4*

A vaporous mixture of a monochlorinated aliphatic hydrocarbon containing 12 to 14 carbon atoms and methanol is led over aluminium oxide in the form of gel. Methylchloride and an olefinic hydrocarbon are formed, the latter having a bromine value of 70 to 80. The chlorine atom may be present in any position in the molecule of the hydrocarbon.

*Example 5*

A vapour mixture of about equimolecular amounts of dichlorethane and methanol is led at 300° C. over peptized aluminium oxide. Vinyl chloride and methyl chloride are thus formed.

*Example 6*

A mixture of 1 molecular proportion of 1.2-dichlorethane and 1 molecular proportion of methanol is led over a highly porous catalyst consisting of a mixture of the phosphates of cerium and bismuth at 300° C., the speed of flow of the vaporous mixture being 200 litres per hour per 1 litre of catalyst. Methyl chloride and vinyl chloride are obtained in good yields, small amounts of carbon oxides and acetaldehyde being present in the reaction product. The non-decomposed portion of the ethylenechloride which amounts to about 20 to 25 per cent may again be employed for further reactions. A similar output is obtained by employing cerium phosphate in the form of gel.

*Example 7*

A vaporous mixture of equivalent amounts of 1.1-dichlorethane and methanol is led over aluminium oxide at 300° C. A mixture of vinyl chloride and methyl chloride is thus obtained in very good yields.

*Example 8*

A mixture of trichlorethane and methanol in equimolecular proportions is led in the form of vapour at from 300° to 320° C. over peptized aluminium oxide gel. A mixture of the cis and trans forms of dichlorethylene, together with asymmetric dichlorethylene and methyl chloride is formed and may be directly separated into its single components.

*Example 9*

A mixture of about equimolecular amounts of tetrachlorethane and methanol is led in the vapour phase over bauxite at from 320° to 330° C. Trichlorethylene and methyl chloride are formed in good yields. Thorium oxide or titanium dioxide may also be used as the catalyst instead of bauxite.

*Example 10*

A vaporous mixture containing equivalent amounts of tetrachlorethane and methanol is led at 280° C. over aluminium oxide gel at the rate of 100 litres of vapour mixture per hour per litre of catalyst. Thichlorethylene and methyl chloride are formed in very good yields.

*Example 11*

A mixture of 1 molecular proportion of tetrachlorethane and 1 molecular proportion of ethyl alcohol is led in the vapour phase under a pressure of 20 atmospheres over peptized aluminium oxide at 280° C. Trichlorethylene and ethyl chloride are formed. Butyl alcohol may also be employed instead of ethyl alcohol; in this case corresponding amounts of butyl chloride are obtained instead of ethyl chloride.

*Example 12*

A vaporous mixture of 1 molecular proportion of tetrachlorethane and 2 molecular proportions of dimethyl ether is led over peptized aluminium oxide at 260° C., the speed of flow being 160 litres of vapour mixture per hour per 1 litre of catalyst. Trichlorethylene and methyl chloride are thus obtained in a good yield.

*Example 13*

A vaporous mixture of 1 molecular proportion of tetrachlorethane and of 2 molecular proportions of diethylether are pumped at a pressure of 28 atmospheres into a pressure tube heated up to 250° C. and charged with a granular hydrate of alumina which has been solidified by means of kaolin. Trichlorethylene and ethyl chloride are thus obtained in a good yield.

*Example 14*

1 molecular proportion of tetrabromethane and 1 molecular proportion of methanol are led as a vapour mixture over peptized aluminium oxide at 280° C. Tribromethylene and methyl bromide are thus obtained.

*Example 15*

A mixture of 1 molecular proportion of pentachlorethane and 1.1 molecular proportions of methanol is vaporized and the vapour mixture led at 280° C. over peptized aluminium oxide at the rate of from 100 to 120 litres of vapour mixture per hour per litre of catalyst. Tetrachlorethylene and methyl chloride are thus obtained in excellent yields.

*Example 16*

A mixture of equivalent amounts of monochlorcyclohexane and methyl alcohol is vaporized and led over aluminium oxide at 280° C. Cyclohexane and methyl chloride are formed in very good yields.

*Example 17*

A vaporous mixture of 1 molecular proportion of monochlorcyclohexane and 0.7 molecular proportion of ethyl ether is led under a pressure of 20 atmospheres and at 270° C. over aluminium hydroxide rendered compact with kaolin. Dihydrobenzene and ethyl chloride are formed in good yields. The formation of ethylene takes place only to a slight extent.

*Example 18*

A vapour mixture of equivalent amounts of vinyl ether and monochlorcyclohexane is led over aluminium oxide at 280° C. Dihydrobenzene and vinyl chloride are formed.

*Example 19*

A vaporous mixture of equivalent amounts of iso-bornyl chloride or bornyl chloride and ethanol or diethyl ether is led over aluminium oxide at between about 170° and about 180° C. Camphene and ethyl chloride are formed in almost quantitative yields.

In methanol or dimethyl ether are employed instead of ethanol or diethyl ether, camphene and methyl chloride are obtained in good yields.

*Example 20*

A mixture of 1 molecular proportion of dibromcyclohexane and 2 molecular proportions of methanol is vaporized and led over aluminium oxide at 300° C. Dihydrobenzene and methyl bromide are obtained in very good yields.

By employing dichlorcyclohexane instead of dibromcyclohexane, dihydrobenzene and methyl chloride are formed in an analogous manner.

What we claim is:

1. The process for the production of alkyl halides and unsaturated organic compounds which comprises reacting oxygen compounds of the class consisting of aliphatic alcohols and ethers with halogenated hydrocarbons which contain in the molecule at least one halogen atom and one hydrogen atom attached to two adjacent carbon atoms and which are selected from the group consisting of halogenated aliphatic hydrocarbons, terpenes and cycloparaffines at from 250° to 350° C. in the presence of a solid, dehydrating catalyst.

2. The process for the production of alkyl halides and unsaturated organic compounds which comprises reacting oxygen compounds of the class consisting of aliphatic alcohols and ethers with halogenated hydrocarbons which contain in the molecule at least one halogen atom and one hydrogen atom attached to two adjacent carbon atoms and which are selected from the group consisting of halogenated aliphatic hydrocarbons, terpenes and cycloparaffines at from 250° to 350° C. in the presence of a solid, dehydrating catalyst, increased pressure being employed.

3. The process for the production of alkyl halides and unsaturated organic compounds which comprises reacting oxygen compounds of the class consisting of aliphatic alcohols and ethers with halogenated hydrocarbons which contain in the molecule at least one halogen atom and one hydrogen atom attached to two adjacent carbon atoms and which are selected from the group consisting of halogenated aliphatic hydrocarbons, terpenes and cycloparaffines at from 150° to 500° C. in the presence of a solid, dehydrating catalyst.

4. The process for the production of alkyl halides and unsaturated organic compounds, which comprises reacting oxygen compounds of the class consisting of aliphatic alcohols and ethers with halogenated aliphatic hydrocarbons which contain in the molecule at least one halogen atom and one hydrogen atom attached to two adjacent carbon atoms at from 150° to 500° C. in the presence of a solid, dehydrating catalyst.

5. The process for the production of alkyl halides and unsaturated organic compounds which comprises reacting oxygen compounds of the class consisting of aliphatic alcohols and ethers with tetrachlorethane at from 150° to 500° C. in the presence of a solid, dehydrating catalyst.

6. The process for the production of alkyl halides and unsaturated organic compounds which comprises reacting oxygen compounds of the class consisting of aliphatic alcohols and ethers with a monochlorinated aliphatic hydrocarbon containing 12 to 14 carbon atoms at from 150° to 500° C. in the presence of a solid, dehydrating catalyst.

LEONID ANDRUSSOW.
GERHARD STEIN.